United States Patent
Boguslawski et al.

(10) Patent No.: US 12,226,979 B2
(45) Date of Patent: Feb. 18, 2025

(54) OPTICAL PATTERN FOR INFORMATION ACQUISITION SYSTEM

(71) Applicant: ACR II GLASS AMERICA INC., Nashville, TN (US)

(72) Inventors: Katharina Boguslawski, Trier (DE); Markus Walter Pohlen, Muckeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 754 days.

(21) Appl. No.: 17/439,459

(22) PCT Filed: Mar. 18, 2020

(86) PCT No.: PCT/EP2020/057474
§ 371 (c)(1),
(2) Date: Sep. 15, 2021

(87) PCT Pub. No.: WO2020/187994
PCT Pub. Date: Sep. 24, 2020

(65) Prior Publication Data
US 2022/0152986 A1    May 19, 2022

Related U.S. Application Data

(60) Provisional application No. 62/886,060, filed on Aug. 13, 2019, provisional application No. 62/866,217, (Continued)

(51) Int. Cl.
*B32B 17/10* (2006.01)
*B32B 7/023* (2019.01)

(52) U.S. Cl.
CPC ........ *B32B 17/10348* (2013.01); *B32B 7/023* (2019.01); *B32B 17/10036* (2013.01);
(Continued)

(58) Field of Classification Search
CPC ........ B32B 17/10348; B32B 17/10036; B32B 17/10266; B32B 17/10706; B32B 7/023; B32B 2605/006
(Continued)

(56) References Cited

U.S. PATENT DOCUMENTS

| 7,790,071 B2 | 9/2010 | Takahashi |
| 8,817,356 B2 * | 8/2014 | Gentry ..................... G02B 5/10 359/267 |

(Continued)

FOREIGN PATENT DOCUMENTS

| EP | 0348855 A2 | 6/1989 |
| EP | 348855 A * | 1/1990 ......... G02B 27/0025 |

(Continued)

OTHER PUBLICATIONS

International Search Report and the Written Opinion for International Application No. PCT/EP2020/057474, Mar. 18, 2020, mailed on Jun. 26, 2020, by International Search Authority/EP, 10 pages.
(Continued)

*Primary Examiner* — Michael M. Bernshteyn
(74) *Attorney, Agent, or Firm* — K&L Gates LLP; Shu Chen

(57) ABSTRACT

The present disclosure relates to a laminated glazing having an information acquisition system viewing area formed to have a pattern in optical power.

17 Claims, 5 Drawing Sheets

Related U.S. Application Data filed on Jun. 25, 2019, provisional application No. 62/820,363, filed on Mar. 19, 2019.

(52) U.S. Cl.
CPC .. B32B 17/10266 (2013.01); B32B 17/10706 (2013.01); *B32B 2605/006* (2013.01)

(58) Field of Classification Search
USPC .......................................................... 428/426
See application file for complete search history.

(56) References Cited

U.S. PATENT DOCUMENTS

| 2012/0099173 | A1* | 4/2012 | Gentry | B60R 1/06 428/80 |
|---|---|---|---|---|
| 2013/0010175 | A1 | 1/2013 | Pichon et al. | |
| 2013/0050489 | A1 | 2/2013 | Taylor et al. | |
| 2016/0243796 | A1* | 8/2016 | Mannheim Astete | B32B 17/10348 |
| 2017/0297310 | A1* | 10/2017 | Mannheim Astete | .. B32B 27/06 |
| 2018/0257342 | A1 | 9/2018 | Yano et al. | |

FOREIGN PATENT DOCUMENTS

| GB | 2509180 A | * | 6/2014 | ......... G02B 27/0103 |
|---|---|---|---|---|
| JP | 2010-274717 A | | 12/2010 | |
| WO | 2011/121219 A1 | | 10/2011 | |
| WO | 2016/143582 A1 | | 9/2016 | |
| WO | 2017/110782 A1 | | 6/2017 | |

OTHER PUBLICATIONS

European Patent Office Examination Report, dated May 25, 2022, for European Patent Application No. 20714155.7, filed Mar. 18, 2020.

* cited by examiner

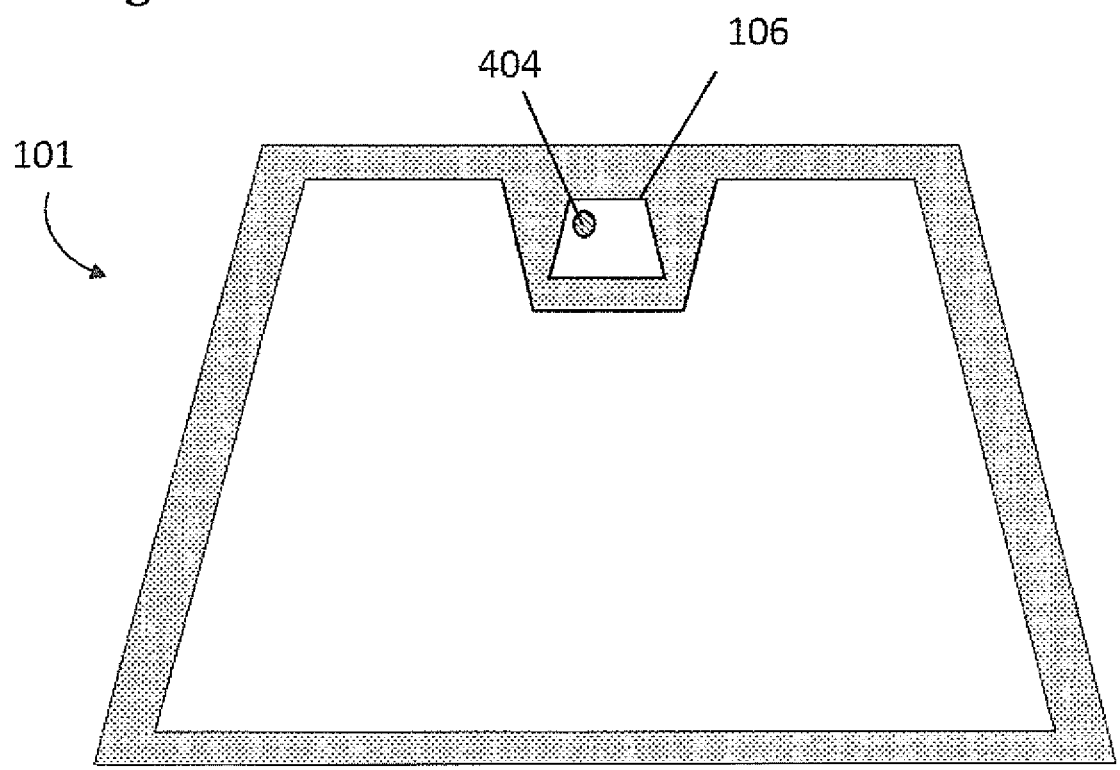

OPTICAL PATTERN FOR INFORMATION ACQUISITION SYSTEM

CROSS REFERENCE TO RELATED APPLICATIONS

This application is a national stage of PCT International Application No. PCT/EP2020/057474, filed Mar. 18, 2020, and claims priority to U.S. Provisional Patent Application No. 62/820,363 filed on Mar. 19, 2019, entitled "OPTICAL PATTERN FOR INFORMATION ACQUISITION SYSTEM," U.S. Provisional Patent Application No. 62/866,217 filed on Jun. 25, 2019, entitled "OPTICAL PATTERN FOR INFORMATION ACQUISITION SYSTEM," and U.S. Provisional Patent Application No. 62/886,060 filed on Aug. 13, 2019, entitled "OPTICAL PATTERN FOR INFORMATION ACQUISITION SYSTEM," all of which are incorporated by reference herein in their entirety.

TECHNICAL FIELD

The present disclosure generally relates to a vehicle glazing having a viewing area through which an information acquisition system collects information, wherein the viewing area for collecting information is formed to provide a pattern in optical power in the viewing area.

BACKGROUND

Information acquisition systems may be mounted inside a vehicle for improving safety performance and comfort of a vehicle, including autonomous vehicles. An information acquisition system may typically include imaging systems, anti-collision systems, brake assisting systems, driving assistance systems and/or auto-driving systems using various electric sensors and/or cameras.

The electric sensors or cameras in information acquisition systems are typically mounted directly on an inner surface of a laminated vehicle windshield or positioned near a vehicle windshield. The sensors or cameras collect information or data regarding conditions outside a vehicle by emitting and/or detecting infrared rays, near infrared rays, laser radar and/or visible light through a windshield.

In order to hide the electric sensors or cameras from view when outside a vehicle, an opaque layer (e.g., dark colored ceramic printing and/or silver printing) may be printed on an inner surface S2 of an outer glass (first glass) or on an outer surface S4 of an inner glass (second glass), in addition to an opaque printing region at the periphery of the laminated vehicle windshield. Such opaque printing regions for hiding the electric sensors or cameras from view may have an opening (i.e., local area without opaque printing) so that the information acquisition system may collect information from outside the vehicle through the camera opening.

Autonomous driving technology makes extensive use of optical sensors and relies on good image quality. Imperfections in the surface of the windshield or other vehicle windows induce optical distortions and may be a concern in reaching optimal image quality. Viewing areas for information acquisition systems that are reproducible in production are needed in the art to provide reliable surfaces to collect information.

Aspects and preferred aspects of our proposals are set out below and in the appended claims. The glazing in combination with an information acquisition system, such as including one or more sensors and/or cameras, is an aspect of the proposals.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 illustrates a glazing having an information acquisition system viewing area having a zoom area, according to an exemplary aspect of the present disclosure.

DETAILED DESCRIPTION

Figure 1:
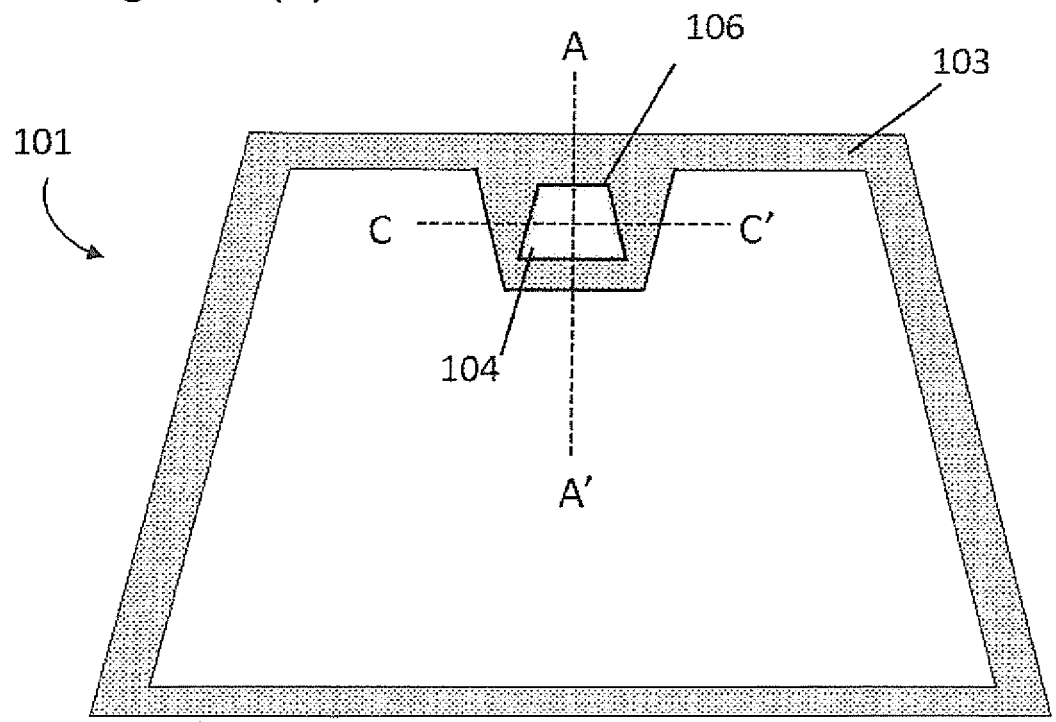
FIG. 1(a) illustrates a glazing having an information acquisition system viewing area having an optical power pattern, according to an exemplary aspect of the present disclosure.
FIG. 1(b) illustrates a glazing having an information acquisition system viewing area having an optical power pattern (a cross-section view along the A-A' axis shown in FIG. 1(a)), according to an exemplary aspect of the present disclosure.
FIG. 1(c) illustrates a glazing having an information acquisition system viewing area having an optical power pattern (a cross-section view along the A-A' axis shown in FIG. 1(a)), according to an exemplary aspect of the present disclosure.
Figure 1:
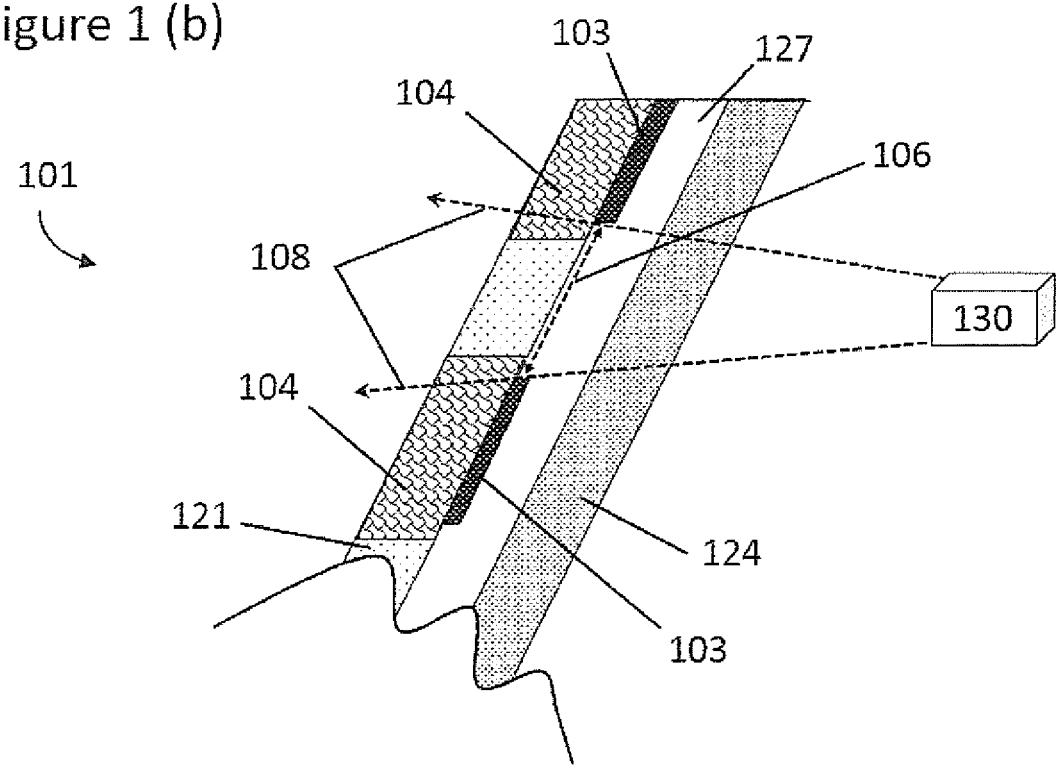
Figure 1:
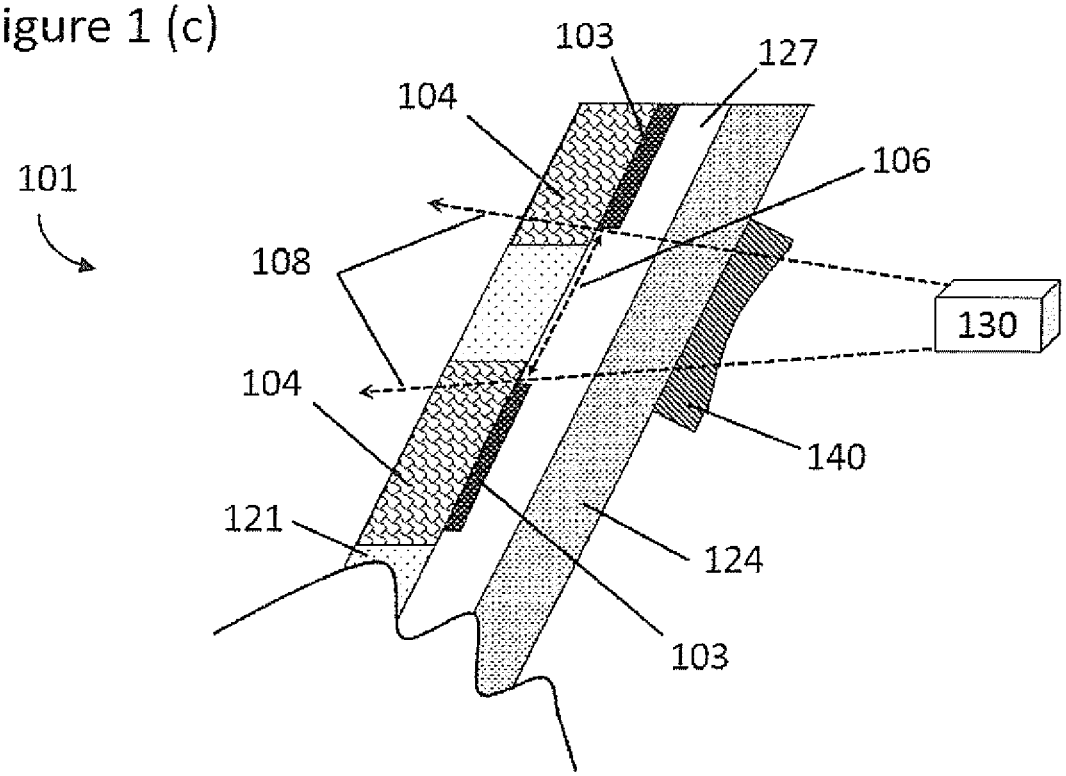

High-resolution information acquisition systems, which may be part of automated safety operations or automated driving of a vehicle, may require a glazing with minimal optical distortion or with a desired pattern of optical power, in a large camera opening. The information acquisition systems may require optical power that is limited by the capabilities of a conventional glass glazing. Thus, it is desired to improve optical quality in a glass glazing.

For purposes of this disclosure, including with reference to the figures, "S1" may refer to an exterior glass substrate surface in a glass product. "S4" may refer to the interior glass substrate surface of a laminated automotive glass product. "S2" may be a glass substrate surface opposite S1 and "S3" may be a glass substrate surface opposite S4. In a laminated glass glazing, S2 and S3 may face each other within the laminated glazing.

Cameras and sensors, or information acquisition systems, are increasingly used in vehicles and may be preferably placed within a vehicle to provide better protection and environmental conditions for the electronics. Where an information acquisition system is placed inside the vehicle, it may collect data through a surface, typically a glass window. The information acquisition system may be placed behind or attached to any suitable glass, including a windshield, side window, pillar, or rear window. The glass window may preferably have minimal distortion to provide a clear viewing surface for the camera or sensor. As technology develops, more powerful and farther distance cameras and sensors are available that may be increasingly sensitive to distortion in a glass window. Further, the use of the information collected may require more details and sharper images. This may be of particular importance where the camera or sensor is placed behind a laminated glass construction, such as a windshield, which may include at least two glass substrates.

Optical distortion may occur in single pane or laminated glass constructs. Curvature of glass may create a change in optical power by a convex lens effect with positive optical power and/or a concave lens effect with negative optical power. Optical power is defined as an inverse of focal length of the convex/concave lens, typically presented in millidiopter ("mdpt"). Optical power may be positive or negative mdpt depending on the lens shape. In conventional laminated glazings, optical power may be in the range of approximately from −200 to 200 mdpt to outside of −400 to 400 mdpt in an information acquisition system viewing area. The optical power may preferably be from −200 to 200 mdpt, more preferably from −100 mdpt to 100 mdpt, and even more preferably from −60 to 60 mdpt.

Optical distortion may be measured as defined in ECE-R43 (Regulation No 43 of the Economic Commission for Europe of the United Nations (UN/ECE)—Uniform provisions concerning the approval of safety glazing materials and their installation on vehicles). Further, optical power may be measured by using ISRA Labscan-Screen 2D inspection equipment. Optical filter settings may be 3/2/0, corresponding to a physical length of 2 mm. Suitable masking filter settings may also be applied such as 6/5/5/R. Horizontal or vertical optical power for transmitted optics may be measured depending on a purpose, location or distribution design of an optical power pattern, or an information acquisition system. In some embodiments, where the glazing is a laminated glazing, transmitted optical power of the laminated glazing may be measured.

In some embodiments, an information acquisition system may perform differently at varying degrees of optical power. For example, the lens through which information is collected, defined by optical power, may be optimized differently based on from what distance information is to be collected by the information acquisition system. Among other features, the present disclosure provides an improved performance information acquisition system viewing area in a glass product. The glass product may be a single glass pane or a laminated glazing. The glass product may include an area for collecting information by an information acquisition system which may preferably include a pattern of optical power across the information acquisition system viewing area. Optical power may be optimized based on various factors, including the distance from which an information acquisition system is to collect information.

Glass may include distortions due to manufacturing and processing methods, including the glass production by a float process. Draw lines, reams (cords), and thermal history variations, which may include refractive index inhomogeneities, thickness variations, surface roughness variations or combinations thereof, formed in glass during production may contribute to transmitted distortion in the glass. Depending on production and process parameters, the glass surface may have varied surface waviness or curvature.

Where multiple glass substrates are combined, such as in a laminated glazing, the optical power and distortion may increase as one substrate may act as a lens, amplifying the distortion of another glass substrate.

Further, glass may include distortions formed due to an opaque printing. For example, flat glass sheets may be bent at thermal bending process temperatures (e.g., greater than 580° C. for soda-lime glass, which may be defined by ISO 16293-1:2008) to form a required three-dimensional shape, which may include cylindrical or spherical shapes, to fit a vehicle's window. Opaque printings may be printed by, for example, screen-printing on flat glass sheets before thermal bending. The screen-printed opaque printings are then fired from 580° C. to 700° C. during the thermal bending process for forming a rigid print with high mechanical durability. In such manufacturing processes, different physical properties, such as light absorptance, elastic modulus, or coefficient of thermal expansion, may be shown between the opaque printing materials, such as black-color ceramic paste, and the glass sheet, which may include a transparent or semi-transparent soda-lime-silica glass material. For example, a black-colored ceramic printing may typically absorb more heat in a bending furnace than the glass sheet resulting in inhomogeneous temperature distribution in the glass sheet. Temperatures in areas of the glass sheet near the black-colored printing area may be locally higher than those areas away from the printing. Moreover, differences may exist between the coefficients of thermal expansion (CTE) of the black-colored ceramic printing and the soda-lime-silica glass sheet, resulting in changes in local curvature and residual stress after temperatures cool down which may affect a refractive index. For at least these reasons, the optical distortion near the opaque printing may be created after the thermal bending process.

The relationship between optical power and local surface curvatures may be, in a simplified way, given by the equation (I):

$$\text{Optical power} = \frac{1}{f} = (n-1)\left[\frac{1}{r_1} - \frac{1}{r_2} + \frac{(n-1)t}{nr_1r_2}\right] \quad (I)$$

wherein f is focal length, n is refractive index, $r_1$ is the radius of local curvature of the first glass substrate, $r_2$ is the radius of curvature of the second glass substrate, and t is thickness of the local lens. According to equation (I), it is understood that the optical power is a function of local surface curvature $r_1$ in the first glass substrate and $r_2$ in the second glass substrate, or local surface curvatures in the S1 and S4 surfaces after lamination. Optical distortions may be a non-zero value of optical power.

Further, glass distortions may be created in localized areas of differential heating. For example, heating mechanisms, including heatable silver lines, may be present in an information acquisition system viewing area. The heating mechanism may be used to keep the area clear of frost and/or fog. Silver may be screen printed, commonly as lines, onto a glass substrate and later provided with an electrical connection to provide heat and clear the information acquisition system viewing area. The silver print may be on surface S2, S3, and/or S4. Preferably, the silver print may be on S4. Due to higher heat dissipation of the silver compared to areas of glass without silver, a thermal inhomogeneity may occur during the glass bending process. The local change in temperature may cause profile deviations around the printed silver lines, which may not be desirable and may create distortion in the information acquisition system viewing area.

Optical power of a glazing may be affected by processing steps, including glass production, which may not provide repeatable optical power. The reproducibility of an optical power pattern may be desirable to provide a determinable information acquisition system viewing area. It may be desirable to control optical power with or without an opaque printed border as optical distortion may be formed in glass without bending or opaque printing and may be preferably determined in a controlled process to provide a desirable optical power and optical power pattern. Thus, it may be desirable to provide a viewing area having at least one optical power value, or two or more optical power values in different regions of the viewing area, which may be repeatedly or reproducibly formed during glazing production.

In some embodiments, as disclosed herein, it may be preferable to provide a pattern of optical power (or distortion), having at least one optical power value or plural optical power values, to meet the viewing needs of an information acquisition system. To collect information from the environment around a vehicle fully, the information acquisition system may collect data from a range of distances, including close to and far from the vehicle. The lens needed to focus on varying distances may preferably have areas having different optical power. For example, a positive optical power may increase visibility near an information acquisition system and a negative optical power may increase visibility far from an information acquisition system. A viewing area having a single optical power value may have a depth of field for collecting information limited by the optical power. The information acquisition system may be limited to focal distances possible in the optical power of the viewing area. It may be preferable that optimal optical power varies within the information acquisition system viewing area where information is collected near and far from a vehicle, such that the optical power may form a pattern. The pattern of optical power may be any suitable pattern. For example, the pattern may include a gradual, or gradient, change in optical power or step changes in optical power in the information acquisition system viewing area. A step change may be a shift in optical power without a gradual change between the two optical power values.

A preferable pattern of optical power may depend on various factors, which may include the viewing range and direction of desired data-collection of the information acquisition system, the size of the vehicle, the location of the information acquisition system in or on the vehicle, and the angle of installation of a glazing in the vehicle. The viewing field from which information is collected by an information acquisition system may include areas close to and far from a vehicle. The optical power of a viewing area through which information is collected may be optimized differently based on the distance from which information may be collected, which may vary within the information acquisition system viewing area. The size of the vehicle and the location of the information acquisition system in relation to the vehicle and the environment around the vehicle may further affect the distance between the information acquisition system and the information to be collected from outside the vehicle and the optimal optical power.

The information acquisition system may be installed such that an optimal optical power may be substantially symmetrical or nonsymmetrical across vertical and/or horizontal axes. It may be preferable, in some embodiments, that the optical power pattern includes a change along a vertical axis in the information acquisition system viewing area. In some embodiments, the optical power may preferably change along a horizontal axis, such that the optical power changes from side to side in the information acquisition system viewing area. For example, in some embodiments, the optical power may increase from a center point towards left and right sides of the viewing area. In further embodiments, the pattern may be formed with changes in optical power along both vertical and horizontal axes. The pattern may further be formed without regard to either axis.

In certain embodiments, a change in optical power along the vertical axis may preferably include an optical power which decreases in value along the vertical axis, upwards from the bottom of the information acquisition system viewing area. The information acquisition system may collect information from the ground close to the vehicle such that a positive optical power may be preferable at a lower portion of the information acquisition system viewing area to provide an improved lens for collecting nearby information. A more positive optical power may incrase the information acquisition system's clarity at close ranges. Such an optical power may be preferable at edges of the information acquisition system viewing area where the information acquisition system is collecting information from near the vehicle, such that the viewing area may include a change in optical power along a horizontal axis. Further embodiments may include a change in optical power along the vertical axis where the optical power increases towards a top of the information acquisition system viewing area as compared to the center of the viewing area. It may be preferable, in some embodiments, to provide a more positive optical power towards the top of the viewing area where, for example, information regarding traffic lights may be collected.

An information acquisition system viewing area may have an optical power pattern that includes one or both of positive and negative optical power. The information acquisition system may include various settings for collecting information near and far which may affect a desired optical power pattern. A negative optical power may provide increased visibility for distance viewing where a focal length is preferred. An information acquisition system may collect information from a distance for various purposes, including determining upcoming traffic or obstacles, for example. A more negative optical power, thus, may be desirable in portions of the information acquisition system viewing area. A positive optical power may be preferable to collect information from a close range. For example, portions of an information acquisition system viewing area may be used for collection near the front of a vehicle or near the sides of the vehicle. The optical power may be affected, for example, by the glass shape, or lens, in an information acquisition system viewing area. Lenses may include any suitable lens shape to obtain a preferred optical power pattern. In some embodiments, a glass viewing area may have any suitable shape, including a concave, convex, plane convex, plane concave, meniscus, or aspherical lens. Further, optical power may be affected by whether there is an opaque print around the viewing area or where the opaque print is located around a viewing area. Process control of these factors or other methods to control optical power may provide a repeatable optical power pattern.

The optical power may be patterned by any suitable means, which may include the placement of prints, films, and/or masks. Opaque printing may be formed on any glass surface, including S1, S2, S3 and/or S4; preferably, the opaque printing is on S2 and/or S4. In particular embodiments, the printing may be formed on flat glass which may subsequently be bent. The optical power pattern may be formed by at least one print at least partially adjacent to the information acquisition system viewing area. For example, the print may form a border around the information acquisition system viewing area, such that it may mask or hide a vehicle interior behind the print. An opaque enamel black print may cause localized differential heating, affecting curvature around the print. The location of an opaque printing may provide a particular change in optical power. Where the glass substrate is heat treated with a printed surface facing upward, a print on S2 or S3 may provide a negative optical power while a print on S1 or S4 may provide a positive optical power. Therefore, printing patterns may be utilized to provide a pattern of optical power around the print(s). The optical power from a printed surface may depend on the manufacturing process. For example, heating and bending glass substrates having a printed surface facing downward may change the optical power of the resulting bent glass around a printed area. The location of the print's edge along with the printed glass surface may affect the optical power pattern of a viewing area completely or partially bordered by the opaque print. For example, the distance between the print and the viewing area may affect how much curvature and optical power change is in the viewing area. Further, the viewing area may include edges not bordered by a black print or including only one black print, such as on S2 or S4. During production, the print may be applied to provide a particular pattern of optical distortion in an information acquisition system viewing area.

In further embodiments, the optical power may be affected by films laminated in or applied to a glazing, including, for example, holographic films. A holographic film may be provided to change optical power which may be affected by the magnification power of the holographic film. A holographic film may be laminated between glass substrates or applied to an outer surface of a glazing and may be provided in part of or in the entire information acquisition system viewing area. Where the holographic film is laminated in the glazing, the film may be adjacent to the S2 surface, the S4 surface, or between polymer interlayers. A laminated holographic film may include a volume hologram while a holographic film applied to an outer glass surface, such as S4, may include a volume or surface hologram. Further, a film, including a holographic portion may be provided in part or all of the information acquisition system viewing area, even where the holographic portion is not provided in the entire information acquisition system viewing area. Holographic films may be utilized to provide a positive or negative optical power or a pattern including both positive and negative optical power.

In some embodiments, a mask may be used to provide a desired pattern of optical power. It may be preferable to include an opaque print around part or all of an information acquisition system viewing area as the opaque print may serve to obscure the vehicle interior behind the print, including a mounting system for the information acquisition system. Changes in optical power due to the opaque print may occur, in part due to the glass bending process. A mask may be used to correct the resulting optical power and provide an optimal optical power pattern. For example, the mask may include a black or dark polymer film adhered to an S4 surface. The mask may hide some change in optical power due to an opaque printing from the information acquisition system and leave a desired pattern of optical power. In such a design, the printed frame or border around the information acquisition system may be larger than the information acquisition system viewing area where the mask is to be placed. The mask may then hide undesirable changes in optical distortion without encroaching on the information acquisition system viewing area. Further, a mask may be laminated in a glazing and create a change in optical power. Where a mask is laminated in the glazing, there may be a local change in glazing thickness as the mask locally increases the laminate thickness. The increase in thickness may create a negative optical power at the relatively thinner laminate around the laminated mask, including a viewing area where the laminated mask provides a viewing area border.

The change in thickness and optical power may further be formed by a thickness change in the polymer interlayer which may cause a change in glass curvature and optical power. An interlayer thickness change may be formed by any suitable means, including a localized increase in interlayer thickness, replacing a portion of the interlayer with a thicker interlayer, or locally adding a layer of interlayer. A polymer interlayer, which may be an adhesive for attaching a first and second glass substrate to form a laminated glazing, may include any suitable material, including polyvinyl butyral (PVB), polyvinyl acetate (PVA), ethylene vinyl acetate (EVA), and/or ionomer materials. The polymer interlayer may include an even or uneven thickness across a glass laminate. As such, there may be localized areas wherein the polymer interlayer has a thicker or thinner depth, which may cause a change in glass curvature and optical power. A change in interlayer thickness may be included within the information acquisition system viewing area to provide a change in optical power in at least a portion of the viewing area and an optical power pattern. The interlayer construction having a change in thickness may or may not further extend outside the information acquisition system viewing area. Further embodiments may include replacing a portion of interlayer material with another interlayer which has a different thickness. For example, a section of polymer interlayer may be removed from a main interlayer portion and replaced with a different polymer interlayer to provide a localized change in polymer interlayer thickness. The replacement polymer interlayer may be in a part of the information acquisition system viewing area or across the entire viewing area. Where the thickness of the interlayer is locally larger than the surrounding interlayer, a positive optical power may be achieved, and where the thickness is locally smaller, a negative optical power may be formed. Replacing a portion of the interlayer in the information acquisition system viewing area may provide a difference in thickness and in optical power. The difference in optical power, or the pattern, may be gradual or a step change. In further embodiments, the optical power may be patterned by adding or removing a portion of the polymer interlayer. A polymer interlayer may have a portion of the interlayer removed to thin the interlayer in an area desired to have a negative optical power and/or an additional interlayer may be added in an area desired to have a positive optical power. Further embodiments may include a non-adhesive interlayer in a portion of the glazing where additional thickness is preferred. The non-adhesive interlayer may be any suitable material, including polyethylene terephthalate (PET), and may preferably be sandwiched between adhesive layers.

In still further embodiments, an optical power pattern may be formed during a glazing manufacturing process. For example, glass heat treatment includes cooling the glass, which may be controlled to provide a desired optical power. Cooling the glass rapidly, for example, may cause a change in refractive index which may create a more positive optical power. In further examples, glass may be locally heat treated, such as with local quenching or heating.

During the lamination process, glass substrates and a polymer interlayer are autoclaved at a desired temperature and pressure (e.g., 100 to 160° C. and 10 to 15 bar). The interlayer may have a single layer or multiple sublayers, such as a tri-layer construction which may include acoustic insulation properties. As the construction is heated during the lamination process, the polymer interlayer may begin to soften. The softened material may then fill any space between the glass substrates as pressure pushes the substrates towards one another. Localized pressure during the lamination process may locally change the optical power of a laminated glazing by controlling the distance between the glass substrates. The localized pressure may provide a positive or negative lens in the viewing area depending on the pressure and where it is applied. The pressure may limit the space available for the polymer interlayer between the glass substrates, creating a local change in thickness and optical power. The change in optical power may be formed to provide a preferable pattern of optical power.

In some embodiments, polishing may be implemented to affect optical power. Positive and/or negative optical power may be caused by polishing of a glass surface. Polishing may include any suitable process, including mechanical and/or chemical polishing. Chemical polishing may include chemical etching, for example. Any suitable chemical etching materials may be used such as hydrofluoric acid solution, nitric acid solution, sulfuric acid solution, ammonium fluoride solution or ammonium hydrogen fluoride, or any combinations thereof. Any glass surface may be polished to create an optical power pattern. Polishing may be applied with or without a masking. Polishing may reduce the thickness of a glass substrate, which may create a negative lens and negative optical power, while polishing around a targeted area may create a positive lens and positive optical power at the targeted area.

The optical power may, in certain embodiments, be patterned by applying a lens in the area of an information acquisition system. A lens may be formed to have a lens shape which may provide a desired optical power pattern. For example, a convex lens may be formed to provide a positive optical power and a concave lens may be formed to provide a negative optical power. The lens shape may be formed to provide a range of optical powers across a viewing area. A lens may be formed having variable strengths of optical power that are all positive, all negative, or a mix thereof. For example, a concave lens may be formed to have a variable lens shape providing a variable optical power. Thus, a lens as disclosed herein may provide a variable focal lens for an information acquisition system.

The lens shape may be formed to provide the desired optical pattern with consideration of a S1 surface. The S1 surface may have a curved shape which may include distortions. Light passing through the viewing area may be affected by the S1 surface and the lens shape, which may have positive and/or negative optical power. The lens may be formed to provide a complementary surface, such that a desired optical power may be formed through the glass and the lens, as the combination of the S1 surface and the lens may together provide the desired optical pattern in the viewing area. For example, an opaque print on an S2 surface may provide a locally negative optical power on the S1 surface that may be compensated for by a lens such that the optical power may become less negative, neutral, or positive. Further, a flat surface on S4 may provide the S1 surface as a lens controlling optical power values. As such, the lens may be formed to have a flat or partially flat surface where the S1 surface provides a desired optical power.

The lens may cover part or all of the viewing area. Further, the edges of the lens may overlap with an opaque print on the glazing, such that the edges of the correcting structure are not visible from a vehicle exterior.

In some embodiments, a lens may be formed on the glazing. The lens, as described herein, may be formed by a mold having a desired lens shape. The mold may be any suitable material and may not adhere to a filling resin, such that the mold may be removed from the cured resin without damaging the glass or lens surface. The mold may be a non-adhering material or coated with a non-adhering material, such as nickel. Further, the mold may be any suitable two or three-dimensional shape or combination of shapes to provide a lens as descried herein. To form the resin lens on a glass surface, in some embodiments, a resin material may be placed on the glass surface and covered with a mold. The resin may then be cured by any suitable means. In further embodiments, the mold may include an input opening, such that the mold may be placed on a glass surface and then filled with a resin material.

In particular embodiments, the filling material may include a resin which may be ultraviolet (UV), heat, or chemically curable. The resin may have a low shrinkage; however, the mold may be formed to accommodate any shrinkage that results from the curing process. The resin material may have a refractive index preferably equal to that of the glass substrate it is formed thereon. For instance, without limitation, soda-lime glass substrates may have a refractive index of approximately 1.52 at visible light wavelengths. Where the refractive index of the resin matches that of the glass substrate, light transmitted therethrough may not be reflected at the resin-glass interface. Since refractive index generally depends on wavelength or frequency of light, the refractive index of the resin may match that of the glass substrate at least at a range of wavelengths or at a particular wavelength which may be used in cameras or sensors. Light may freely transmit through the glass glazing and the resin with no or little reflection where the refractive index of the resin and the glazing match or substantially match. The resin may include, as a nonlimiting example, Norland Optical Adhesive 61 from Norland Products Incorporated.

The resin may be cured by any suitable means. For example, in certain UV-cured embodiments, the resin may be cured by UV-illumination through the shaping mold. The mold may be transparent to UV light in a wavelength used to cure the resin. The resin may also be cured through UV light administered through the glass substrate or laminated glass product. In a laminated glass product, the resin may be selected such that the resin is cured with exposure to wavelengths above 380 nm. A polymer interlayer may be UV-absorbing and a non-absorptive wavelength may cure the resin through the polymer interlayer. In further embodiments, a prism may be used to direct a UV light source and using the glass substrate(s) as a waveguide to direct the light to the resin within a mold.

In particular embodiments, a hard coating may be formed over the cured resin. Such a hard coating may provide a protective layer over the resin. In some embodiments, an anti-fog film may be provided over the resin to provide an anti-fog surface in the face of a camera or sensor.

The pattern of optical power may be formed by any suitable method or any combination of methods, including those described herein. An optical power pattern may preferably include positive and/or negative optical power.

Where positive and negative optical power are desired, the positive and negative optical power may or may not be present in equal amounts or even patterns across an information acquisition system viewing area. The desired optical power may preferably be defined by curvature in glass substrate(s). The curvature may be related to the optical power as described herein by equation (I). In some embodiments, optical power may be defined by a refractive index in glass. Equation (I) may define optical power that may result from a particular refractive index. Further, a glazing may have some non-zero optical power and any suitable method, including those described herein, may form an optical pattern by further changing the non-zero optical power. This may include making a negative optical power more positive without creating a positive optical power or making a positive optical power more negative without creating a negative optical power. As used herein, positive optical power may relate to relatively more positive optical power than an adjacent optical power value and a negative optical power may relate to relatively more negative optical power than an adjacent optical power value.

In some embodiments, a glazing may have more than one information acquisition system viewing area. Information acquisition systems may or may not be part of a single system, such as in a stereo camera system. Each information acquisition system may be placed in different points behind a glazing and may require separate viewing areas. Different systems and/or different locations behind a glazing may have different preferable optical power patterns. Thus, a single glazing may include more than one viewing area which may have distinct optical power patterns. Where there is more than one viewing area in a glazing, the viewing areas may be separated or not separated by an obstruction on the glazing, including an opaque printing. Multiple viewing areas may have a single lens with an optical power pattern or multiple lenses having optical power patterns suitable for each viewing area. A single lens may have an optical power pattern that is the same or different across multiple viewing areas.

As light passes through the glazing to reach an information acquisition system, some light may be reflected off of glass surfaces and form a double or ghost image for the information acquisition system. The strength of the ghost image may increase with a stronger lens or more optical power in the glazing. Thus, it may be preferable to provide an anti-reflective coating on the S1 and/or S4 surfaces. The anti-reflective coating may minimize a ghost image perceived by the information acquisition system and improve the system's capabilities.

FIG. 1(a) illustrates a glazing 101 having an information acquisition system viewing area 106. The information acquisition system viewing area 106 shown is bordered by an opaque printing 103 and includes changes in optical power 104. As shown in FIG. 1(a), the viewing area 106 may include changes in optical power 104 along both a vertical axis A-A' and a horizontal axis C-C'. FIGS. 1(b) and 1(c) show certain embodiments of the information acquisition system viewing area 106 along vertical axis A-A'. The information acquisition system 130 includes a field of view 108 which extends through the viewing area 106. In FIG. 1(b), an opaque printing 103 is shown on a first glass substrate 121, where a polymer interlayer 127 and the opaque printing 103 are laminated between the first glass substrate 121 and a second glass substrate 124. In FIG. 1(c), the opaque printing 103 is shown on the first glass substrate 121. The opaque printing 103 may or may not align with the field of view 108, such that in some embodiments the printing 103 may provide a larger opening than the field of view 108, for example. FIG. 1(c) further illustrates a lens 140 formed on the second glass substrate 124. The lens 140 may have a curvature to provide a desired optical power or optical power pattern in a viewing area 106, including optical power changes across vertical and/or horizontal axes.

Figure 2:
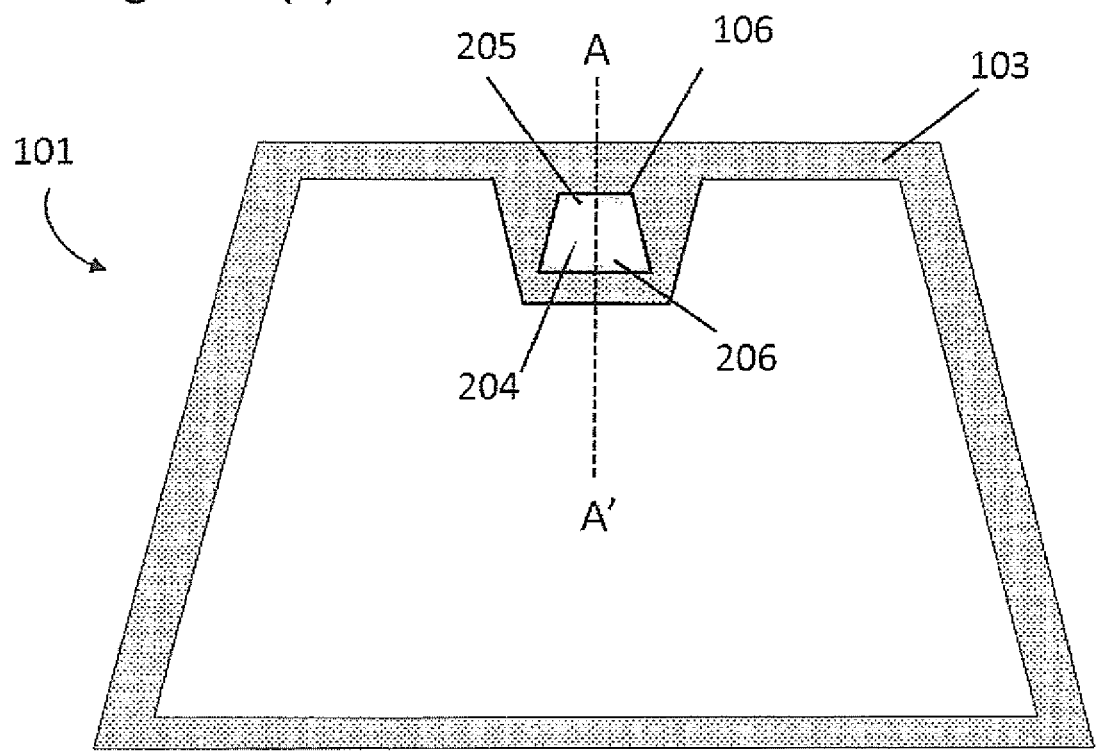
FIG. 2(a) illustrates a glazing having an information acquisition system viewing area having an optical power pattern, according to an exemplary aspect of the present disclosure.
FIG. 2(b) illustrates a glazing having an information acquisition system viewing area having an optical power pattern (a cross-section view along the A-A' axis shown in FIG. 2(a)), according to an exemplary aspect of the present disclosure.
FIG. 2(c) illustrates a glazing having an information acquisition system viewing area having an optical power pattern (a cross-section view along the A-A' axis shown in FIG. 2(a)), according to an exemplary aspect of the present disclosure.
Figure 2:
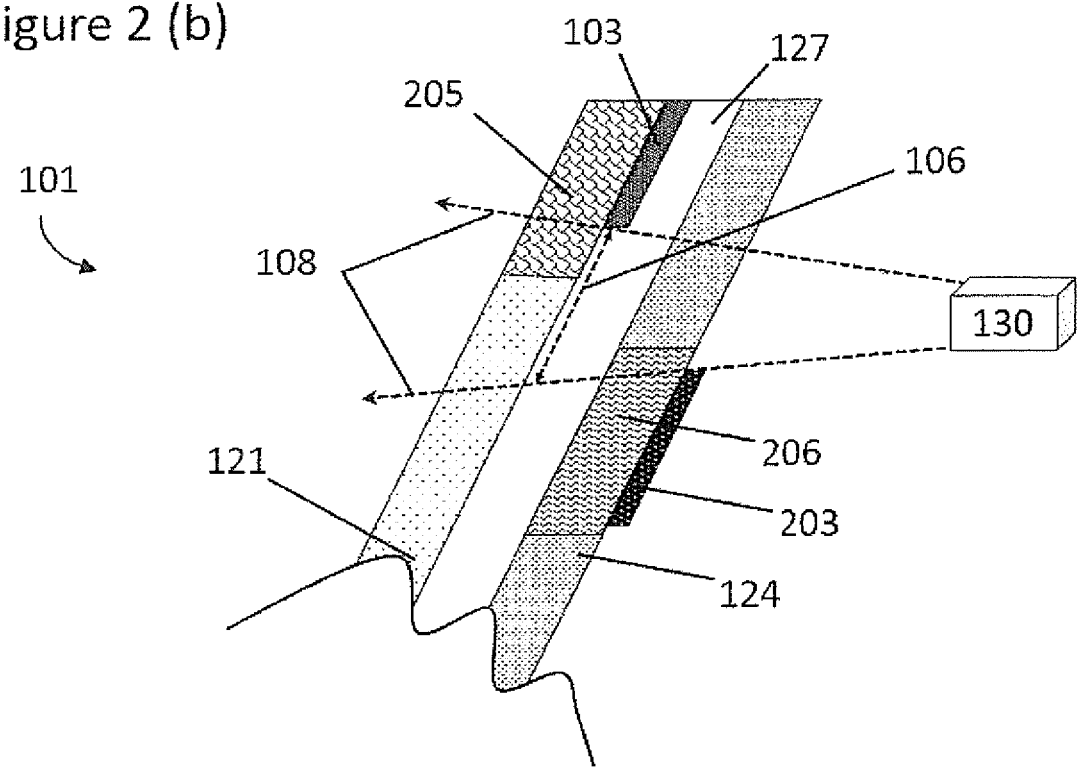
Figure 2:
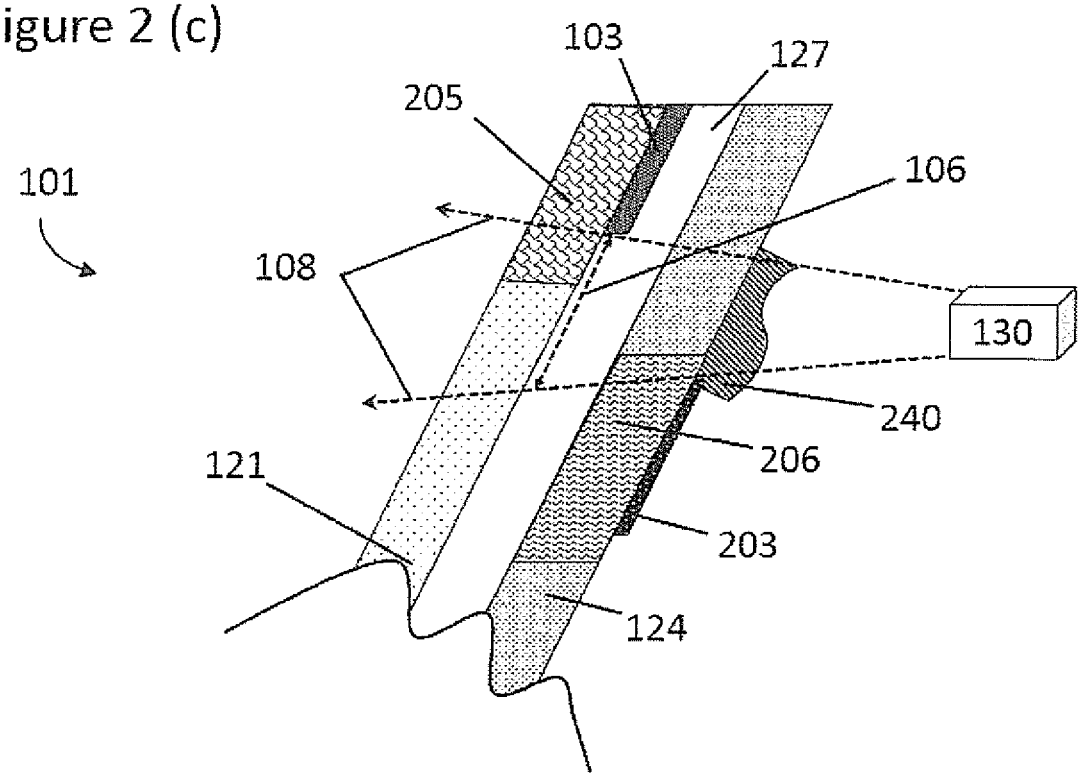

As shown in FIG. 2(a), an exemplary information acquisition system viewing area 106 may have an optical power pattern 204 which includes separate areas of optical power change 205, 206. FIGS. 2(b) and 2(c) show certain embodiments of the exemplary viewing area 106 along vertical axis A-A'. In FIG. 2(b), opaque print 103 is shown to be on the first glass substrate 121 and opaque print 203 is shown on the second glass substrate 124. The opaque printing 103 on the first glass substrate 121, particularly on a glass surface within the lamination (S2), may form a negative optical power 205 while the opaque printing 203 on the second glass substrate 124, particularly on the exterior glass surface (S4), may form a positive optical power 206. The pattern of optical power 204 may thus be formed with both more positive and more negative optical power. FIG. 2(c) further shows the inclusion of a lens 240, which may affect the pattern of optical power 204. The lens 240 may, for example, provide both convex and concave lens portions within a viewing area 106. The pattern of optical power 204 may be achieved without the opaque printing 103 and/or 203, by any suitable methods disclosed herein, such as placement of films or masks, controlling of manufacturing processes, an interlayer with desired thickness pattern, polishing, forming a lens, etc.

Figure 3:
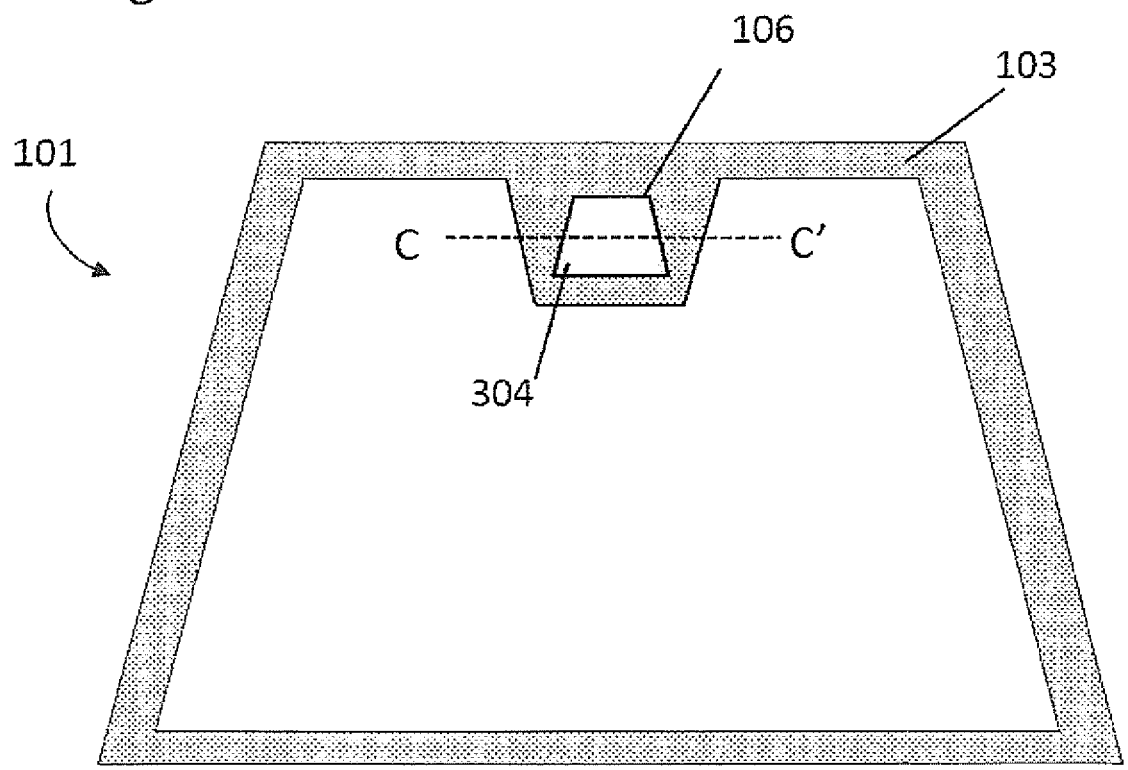
FIG. 3 illustrates a glazing having an information acquisition system viewing area having an optical power pattern, according to an exemplary aspect of the present disclosure.

FIG. 3 further shows an exemplary optical power pattern 304 having a change along horizontal axis C-C'. The optical power pattern 304 may be formed by any of the methods disclosed herein.

In further embodiments, the pattern may include a localized area having an optical power different from the majority of the information acquisition system viewing area, i.e. a zoom area. Such a zoom area may include positive or negative optical power to provide a lens for the information acquisition system to zoom in or zoom out to collect information from far or near. The localized zoom area may provide multiple views to the information acquisition system which may collect information from each of the views available. The aggregate of the information may be used by the system to provide information on the surroundings of a vehicle. A zoom area may be any suitable size and shape. In certain embodiments, the zoom area may be circular in shape and comprise a minority of the information acquisition system viewing area. The zoom area may have a border which gradually changes in optical power or provides a step change in optical power from a surrounding part of the viewing area. In some embodiments, the viewing area may include more than one zoom area, which may have the same or different optical powers. For example, the information acquisition system viewing area may include a zoom out area and a zoom in area. In some further embodiments, multiple zoom areas in an information acquisition system viewing area may have the same or substantially the same optical power. As shown in FIG. 4, the zoom area 404 may be within the information acquisition system viewing area 106.

Preferably, a zoom area 404 may be placed in any suitable area of the information acquisition system viewing area 106 and may depend on a desired zoom direction, as well as whether the zoom area 404 enhances near or distance information collection. Further, the size of the zoom area 404 may depend on the size of the viewing area 106, as a larger viewing area 106 may allow for a larger zoom area within the viewing area 106. The zoom area 404 further may be sized to collect the desired amount of information from a near or far distance. Negative optical power may be used to facilitate collection of information from a distance while positive optical power may provide for an information acquisition system to collect information at a close range.

A zoom area 404 in the information acquisition system viewing area 106 may be formed by methods disclosed herein. In particular embodiments, the zoom area 404 may be formed by a film, such as a holographic film laminated in or applied to a glazing 101. Where the holographic film is laminated in the glazing 101, a non-holographic film may cover the information acquisition system viewing area 106 outside the zoom area 404. The non-holographic film may include a polyethylene terephthalate film which has a portion removed at the zoom area 404. A holographic film may be provided in the portion without a non-holographic film, giving a holographic zoom area laminated in the glazing 101. In further embodiments, the holographic film may be adhered to the S4 surface of the glazing 101.

In some embodiments, a lens may be applied to S4 in a zoom area 404. The lens may be formed to provide the desired lens shape for the zoom area 404. Additional thickness in the glazing 101 may further provide a zoom area 404 where the lens is locally formed. The additional thickness may be formed by the inclusion of a laminated film or a thicker area of interlayer material.

In further embodiments, a difference or local variation in refractive index of at least one of the first and second glass substrates of a glazing may provide a local difference in optical power. In some embodiments, a material having a different refractive index from the glazing 101 may be applied to the glazing 101 to provide a zoom area 404 with a different optical power from the surrounding area. The material having a different index of refraction may be provided in any suitable form, including a film or a coating. In certain embodiments, the material having a different index of refraction may be laminated within a glazing 101 in the viewing area 106. The optical power (1/f) may be determined using the index of refraction according to equation (I) disclosed herein.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A glazing, comprising:
    a viewing area of an information acquisition system, wherein the viewing area is formed to provide an optical power pattern in which optical power varies across the viewing area, based on distance from which information is collected, and wherein the optical power is transmitted optical power,
    wherein the optical power pattern is formed by a film, and the film is a holographic film.

2. The glazing according to claim 1, wherein the optical power pattern comprises a gradient change in optical power in the viewing area.

3. The glazing according to claim 1, wherein the optical power pattern comprises a change in optical power along a vertical axis in the viewing area.

4. The glazing according to claim 3, wherein the optical power pattern decreases in optical power upward along the vertical axis.

5. The glazing according to claim 1, wherein the optical power pattern comprises a change in optical power along a horizontal axis in the viewing area.

6. The glazing according to claim 5, wherein the optical power is substantially symmetrical along the horizontal axis of the viewing area.

7. The glazing according to claim 1, wherein the optical power pattern is formed by at least one print at least partially adjacent to the viewing area.

8. The glazing according to claim 1, wherein the optical power pattern is formed by a change in glazing thickness.

9. The glazing according to claim 8, wherein the glazing comprises a first glass substrate, a second glass substrate, and a polymer interlayer; and
    wherein the change in glazing thickness is due to a change in thickness of the polymer interlayer.

10. The glazing according to claim 1, wherein the glazing comprises a first glass substrate and a second glass substrate,
    wherein the optical power pattern is determined by a localized curvature in at least one of the first and second glass substrates.

11. The glazing according to claim 1,
    wherein the glazing comprises a first glass substrate, and
    wherein the optical power pattern is determined by a difference in refracture index of at least one of the first and second glass substrates.

12. The glazing according to claim 1, further comprising a lens formed on at least a portion of the viewing area, wherein the lens is formed to provide the optical power pattern in the viewing area.

13. The glazing according to claim 1, wherein the optical power pattern comprises a zoom area having an optical power different than an optical power of a majority of the information acquisition system viewing area.

14. The glazing according to claim 1, wherein the optical power pattern includes a concave lens or a convex lens.

15. The glazing according to claim 1, wherein the optical power pattern includes positive and negative optical power.

16. A method of preparing the glazing according to claim 1, the method comprising:
    providing the glazing having a viewing area through which an information acquisition system is configured to collect information; and
    providing a pattern of optical power in the viewing area by applying an uncured resin to the glazing in the viewing area, molding the uncured resin to form a desired lens structure, and curing the resin,
    wherein the optical power is transmitted optical power.

17. The glazing according to claim 1, wherein the glazing has a curvature.

* * * * *